United States Patent
Hasselwander

(10) Patent No.: US 9,533,255 B2
(45) Date of Patent: Jan. 3, 2017

(54) METHOD AND APPARATUS FOR REMOVING MERCURY FROM GAS

(75) Inventor: Klaus Hasselwander, Oberursel (DE)

(73) Assignee: OUTOTEC (FINLAND) OY, Espoo (FI)

( * ) Notice: Subject to any disclaimer, the term of this patent is extended or adjusted under 35 U.S.C. 154(b) by 39 days.

(21) Appl. No.: 14/424,036

(22) PCT Filed: Aug. 30, 2012

(86) PCT No.: PCT/EP2012/066883
§ 371 (c)(1),
(2), (4) Date: Mar. 26, 2015

(87) PCT Pub. No.: WO2014/032719
PCT Pub. Date: Mar. 6, 2014

(65) Prior Publication Data
US 2015/0231559 A1  Aug. 20, 2015

(51) Int. Cl.
*B01D 53/64* (2006.01)
*B01D 53/74* (2006.01)
*B01D 53/78* (2006.01)
*B01D 53/79* (2006.01)

(52) U.S. Cl.
CPC .............. *B01D 53/64* (2013.01); *B01D 53/79* (2013.01); *B01D 2251/108* (2013.01); *B01D 2257/602* (2013.01)

(58) Field of Classification Search
CPC ......... B01D 53/64; B01D 53/74; B01D 53/78; B01D 53/79
See application file for complete search history.

(56) References Cited

U.S. PATENT DOCUMENTS

| | | | | |
|---|---|---|---|---|
| 3,849,537 A * | 11/1974 | Allgulin | ................. | B01D 53/64 423/210 |
| 4,233,274 A * | 11/1980 | Allgulin | ................. | B01D 53/64 423/210 |
| 4,640,751 A * | 2/1987 | Dyvik | ................. | B01D 53/64 205/562 |
| 5,009,871 A | 4/1991 | Higuchi et al. | | |
| 2003/0099585 A1* | 5/2003 | Allgulin | ................. | B01D 53/64 423/210 |
| 2010/0320294 A1* | 12/2010 | Neumann | .......... | B01D 53/1475 239/556 |
| 2011/0027153 A1* | 2/2011 | Dickson | ................. | B01D 53/64 423/210 |
| 2015/0290582 A1* | 10/2015 | Dickson | ................. | B01D 53/64 423/210 |

FOREIGN PATENT DOCUMENTS

| | | | | |
|---|---|---|---|---|
| AU | 2010276057 B2 * | 5/2014 | ............. | B01D 53/64 |
| DE | 19717798 A1 | 10/1998 | | |
| WO | WO 9853900 A1 | 12/1998 | | |
| WO | WO 2011009217 A1 * | 1/2011 | ............. | B01D 53/64 |

* cited by examiner

*Primary Examiner* — Timothy Vanoy
(74) *Attorney, Agent, or Firm* — Leydig, Voit & Mayer, Ltd.

(57) ABSTRACT

A process for removing mercury from a process gas includes: (i) reacting mercury vapor present in the process gas with mercuric chloride dissolved in a scrubbing solution so as to form a suspension containing mercurous chloride; and (ii) settling the mercurous chloride out of the suspension. Chlorine is injected into the suspension before the settling step (ii) so as to form a reaction solution.

12 Claims, 2 Drawing Sheets

METHOD AND APPARATUS FOR REMOVING MERCURY FROM GAS

CROSS-REFERENCE TO PRIOR APPLICATIONS

This application is a U.S. National Phase Application under 35 U.S.C. §371 of International Application No. PCT/EP2012/066883, filed on Aug. 30, 2012. The International Application was published in English on Mar. 6, 2014 as WO 2014/032719 under PCT Article 21(2).

FIELD

The present invention relates to a method and an apparatus for removing gaseous elementary mercury from a process gas comprising the following steps:
(i) reacting the mercury vapour present in the process gas with mercuric chloride ($HgCl_2$) dissolved in a scrubbing solution to form a suspension containing solid mercurous chloride (Calomel)
(ii) settling the mercurous chloride (Calomel) out of the solution.

BACKGROUND

Mercury (Hg) having the atomic number 80 is a heavy, silvery element and the only metal that is liquid at ambient temperature and pressure conditions (freezing point −38.8° C.; boiling point 356.7° C.). In addition mercury also has a high vapour pressure.

Mercury occurs in deposits throughout the world and is often associated with copper, zinc, pyrite and lead ores as well as coal. Upon thermally treating these ores or coals containing traces of mercury the mercury is volatized as mercury vapor and carried out with the off-gases.

Mercury and most of its compounds, however, are extremely toxic and must be handled with care. Accordingly, most countries have extremely stringent requirements with regard to the emission of mercury from industrial processes and the presence of mercury in products produced from process gases such as sulphuric acid from $SO_2$-containing gases released in pyrometallurgical processes. Gases containing elementary mercury have constituted one of the great sources of the emission of industrial mercury to the environment and many new gas cleaning processes have been proposed during the last 30 years for eliminating the elementary mercury from such gases. Examples of such removing processes are the 'Bolkem process', the use of a selenium filter or a selenium scrubber.

However, the majority of these proposed gas cleaning processes and particular those that are most efficient are technically very complicated and require the use of expensive special apparatus or sophisticated reactants and additives in order to achieve a satisfactory result. One of the few processes that is widely used in practice and that also belongs to the most effective processes and that, therefore, has dominated the marked at least with regard to its application in the metallurgical field is the so called 'Boliden-Norzink process' also referred to as the 'chloride process' or Calomel Process. This method is very effective in removing mercury from $SO_2$-gas processed to sulphuric acid. A product acid containing less than 0.5 ppm mercury can be produced from a gas containing up to 150 ppm mercury.

The process, of which various embodiments are described in more detail in U.S. Pat. No. 3,849,537, U.S. Pat. No. 4,233,274 and U.S. Pat. No. 4,640,751, is carried out in a plant shown in FIG. 1:

The process gas containing mercury is introduced via line 11 into a packing 10a of a scrubbing tower 10. In the scrubbing tower a solution containing dissolved mercuric chloride ($HgCl_2$) is circulated (pump 14, lines 13, 15, 17). The mercuric chloride reacts with mercury contained in the process gas to form mercurous chloride (calomel) as follows:

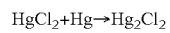

The scrubbing process removes mercuric chloride from the scrubbing solution. If the concentration of mercuric chloride is not maintained, the scrubbing solution will become ineffective. The concentration of $HgCl_2$ in the solution must be measured and if the concentration falls below a given value strong solution must be added. Sampling, measuring and adjustment of concentration must be done by experienced operation personnel. But due to the mix of continuous operation (scrubber) and batch-wise operation (addition of strong solution) the efficiency of the scrubbing process is slightly fluctuating.

To overcome the concentration losses so-called strong solution is added into the scrubbing tower from storage tank 38 via line 39. Strong solution contains $HgCl_2$ in concentrations 10-20 times more than the concentration in the reaction circuit. Mercurous chloride (calomel) formed during the reaction is insoluble and precipitates from the solution.

The overflow from settler 20 is recirculated to the scrubbing tower, via pipeline 50. The process consumes mercuric chloride ($HgCl_2$) continuously. The concentration of the reaction solution is maintained by batch-wise addition of strong solution.

Strong solution is produced in a separate circuit by regeneration of calomel removed from the reaction circuit via the settlers. A so-called chlorination tank 30 is used. Chlorine from bottles 40 is injected via pipeline 41 and injecting device 34 into a circulating stream of pump 32 lines 31, 33, 35 and 36. Chlorine is absorbed in the solution and reacts with mercurous chloride (calomel) to form strong mercuric chloride solution.

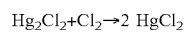

When the required concentration for the strong solution is achieved, it is pumped through line 37 into a storage tank 38 from where it is fed to the scrubbing tower 10.

It takes about two days to generate sufficient strong solution to operate the scrubbing tower 10 for about two weeks. While $HgCl_2$ is produced in the regeneration tank 30, the concentration of the mercury (II) chloride ($HgCl_2$) is measured. If the chlorine concentration drops below a certain level, additional chlorine will be injected. This procedure is repeated until a washing solution with the defined concentration is achieved. As the process kinetics are quite complex, the addition of new chlorine is not done automatically, but by hand.

The production of strong solution is operated as a discontinuous process, while the removal of the mercury from the off-gases is a continuous process. The storage tank 38 serves to couple these two operating modes as it provides a buffer for the continuous addition of washing solution and compensates fluctuations in the mercury content in the off-gases.

SUMMARY

In an embodiment, the present invention provides a process for removing mercury from a process gas including: (i)

reacting mercury vapour present in the process gas with mercuric chloride dissolved in a scrubbing solution so as to form a suspension containing mercurous chloride; and (ii) settling the mercurous chloride out of the suspension. Chlorine is injected into the suspension before the settling step (ii) so as to form a reaction solution.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
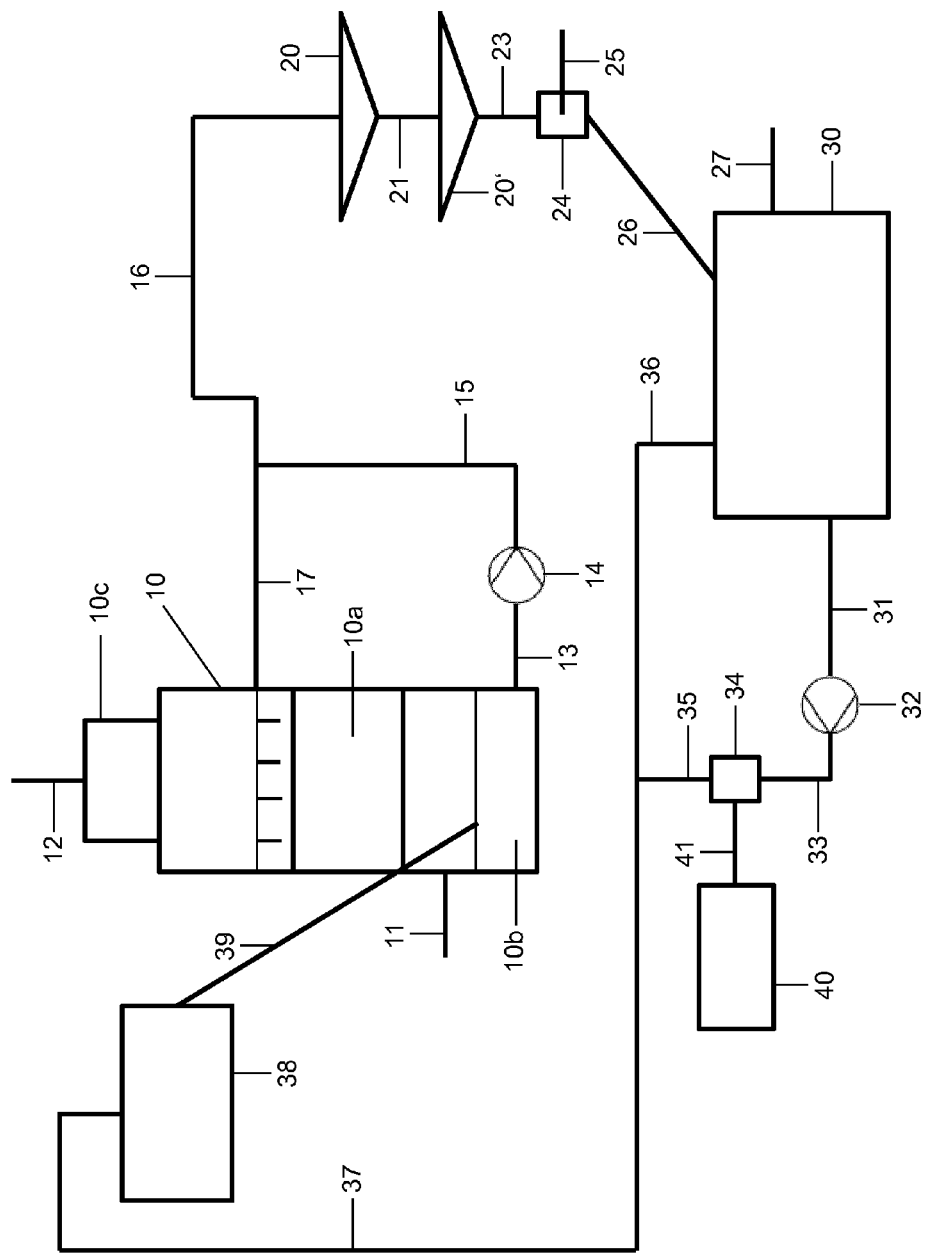
FIG. 1 shows a process for removing mercury including the discontinuous production of the scrubbing solution according to the state of the art.

Taken as a whole, the present invention recognizes that, if it were possible to generate the washing solution in a continuous process, the entire process for removing mercury from off-gases would become more beneficial since the batch-wise production of strong solution be reduced or even become completely unnecessary. As mentioned before, one of the most serious problems in the process is that it is only partly possible to react to significant and suddenly increasing amounts of mercury in the gas which requires large storage tanks to avoid that the process has to be stopped until new washing solution is produced in the discontinuous process.

Therefore, an embodiment of the present invention provides an improved process which eliminates the problems and drawbacks discussed above and which is able to meet future industrial requirements with respect to improved process control. The goal of an embodiment of the invention is to produce the washing solution in an at least partly continuous process.

According to an embodiment of the present invention, chlorine gas is injected directly into the scrubber circuit containing mercurous chloride (calomel). Accordingly, the production of $HgCl_2$ does not take place in a separate tank, but is at least partly moved between the scrubbing tower and the settler. As a result, the production of $HgCl_2$ is part of the continuous process of scrubbing and settling.

Nevertheless, to buffer-up a reliable Hg content in the gas stream a preferred embodiment of the invention provides an additional tank to which the settled mercurous chloride is supplied to produce a further amount of scrubbing solution in a discontinuous process similar to the state of the art. With such a process comprising two devices for injecting chlorine it is secured that the resulting scrubbing solution does not contain a high amount of unreacted chlorine.

The chlorine injected to the scrubber circuit is between 20 to 100 mol-%, preferably between 80 and 100 mol-% of the amount which is needed for the scrubbing process. Working with the most preferred value of 100 mol-% allows to operate the process without an additional tank for the discontinuous production of the scrubbing solution.

In another preferred embodiment of the present invention, a side stream of the suspension is branched off and the chlorine is injected to this side stream in order to improve the mixing of the reactants.

In accordance with another preferred embodiment of the invention, at least part of the reaction solution is returned to the scrubbing tower before the settling step. Such an additional possibility for recirculating the washing solution gives the opportunity to quickly react to fluctuations in the mercury amount of the gas stream.

Preferably, the settling of the mercurous chlorides takes part in two stages, wherein zinc dust is mixed to the second stage to further aid in the precipitation of calomel from the solution.

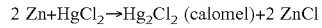

$$2\ Zn + HgCl_2 \rightarrow Hg_2Cl_2\ (calomel) + 2\ ZnCl$$

This reaction allows discharging the liquid "free of mercury" into further treatment steps.

In a further preferred embodiment of the invention, the amount of chlorine injected to the scrubbing circuit is controlled by the chlorine measured in the process gas withdrawn from the scrubbing tower. Using this operating method, a manual measurement is no longer necessary. Especially if 100 mol-% of the amount needed to generate the scrubbing solution is injected to the suspension before the settling, this method can guarantee that no chloride is carried out of the process by the scrubbed gas stream.

An embodiment of the invention can be carried out successfully especially if the process gas is $SO_2$, because when producing $SO_2$ by roasting relatively high amounts of mercury are present in the $SO_2$ gas stream.

An embodiment of the invention further covers a plant for removing mercury from a process gas. Such a plant comprises a scrubber for reacting the mercury in the process gases with mercuric chloride in a scrubbing solution to form mercurous chloride in a suspension. The plant further comprises at least one settler to settler the mercurous chloride out of the suspension and further treatment steps as described above. Furthermore, the plant features an injection device in the scrubbing circuit or in a parallel line.

In a preferred embodiment, the scrubber is a packed tower. Normally, the mercury absorption tower is a fiberglass reinforced vertical cylindrical vessel. Particularly good results are achieved if the tower is packed with polypropylene packing, generally saddles. In such a tower, the scrubbing solution is sprayed onto the top of the packing through a series of nozzles. A chevron and mesh pad mist eliminator at the top of the tower prevents the carryover of scrubbing solution out of the scrubber.

Figure 2:
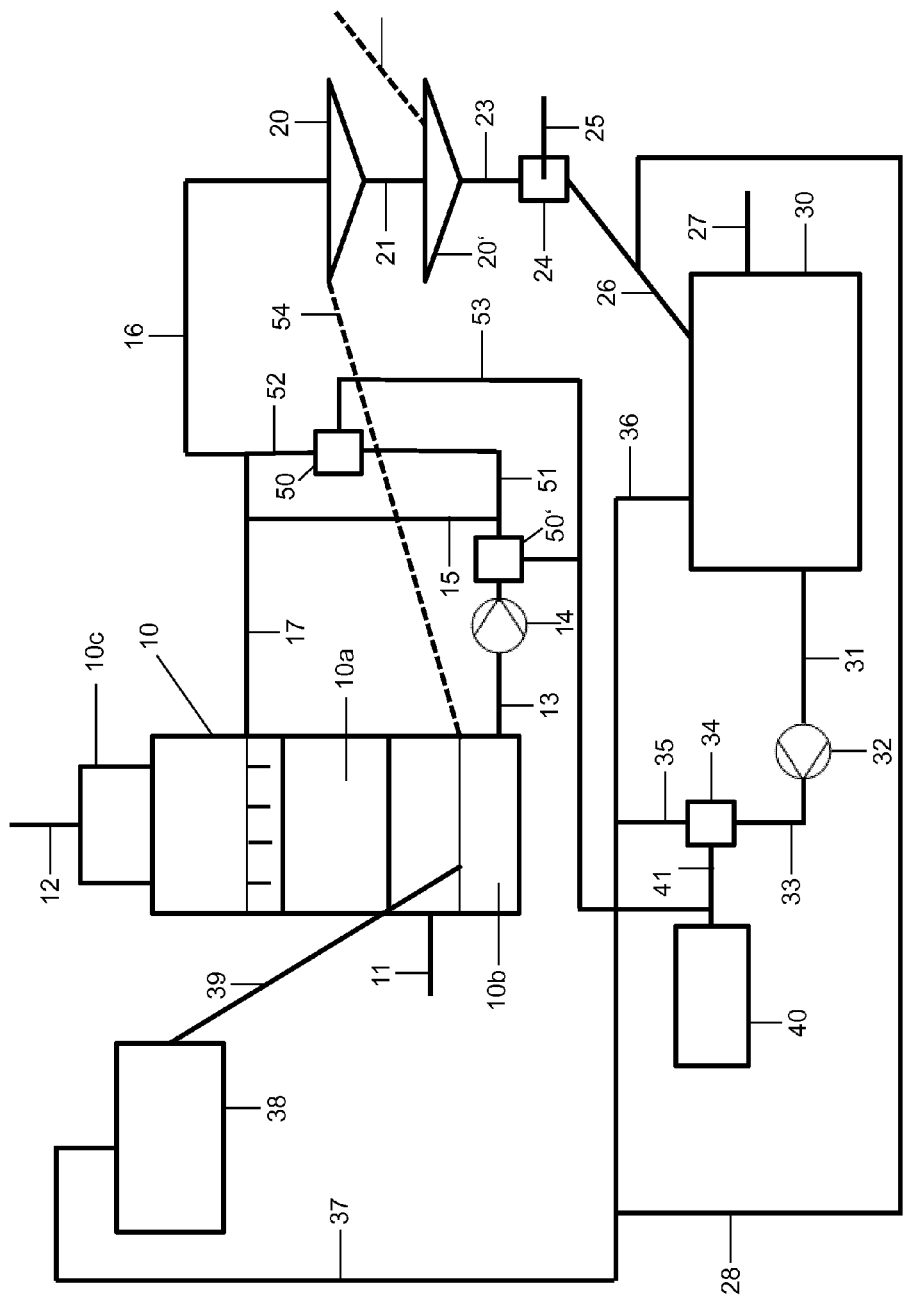
FIG. 2 shows a process for removing mercury from a process gas according to an embodiment the invention.

The process as shown in FIG. 2 differs from the standard process shown in FIG. 1 essentially only with regard to the preparation of the scrubbing solution. In the subsequent description, therefore, same elements are designated with the same reference numbers as in FIG. 1, the respective description given with regard to FIG. 1 still applies and a redundant explanation is omitted.

In the process as illustrated in FIG. 2, the mercury present in the process gas in guided into the scrubber (tower) 10 via line 11 and reacts with the washing solution comprising $HgCl_2$ to form $Hg_2Cl_2$. The washing solution is pumped around from the pump tank 10b. Via a mist eliminator 10c at the top of the tower 10 the cleaned process gas is withdrawn.

A part of the suspension, which includes scrubbing solution and $Hg_2Cl_2$, is withdrawn via line 13 through pump 14 and supplied via lines 15 and 16 to settler units 20 and 20'. A part of the suspension is recirculated through line 17 into the tower 10.

From line 15 a bypass line 51 is branched off which feeds the suspension containing mercurous chloride to an injector 50. In this injector 50, chlorine is injected into the suspension, wherein the injector 50 is fed with chlorine from a stock 40 via line 53. The suspension having a high chlorine content is fed via line 52 into line 16 where the regeneration of the scrubbing solution takes place and a reaction solution still containing solid $Hg_2Cl_2$ is formed.

In the settlers 20 and 20' the solid calomel precipitates from the suspension and settles down. To the remaining suspension flowing to the secondary settler 20' zinc dust can be added through line 22 to further aid in the precipitation of mercury from the solution. In a separator 24 the solid calomel is separated from the reaction solution and withdrawn.

The remaining reaction solution can be recycled from the first settler 20 directly to the scrubbing tower 10 via line 54 or from the second settler 20' via lines 23, 26, 28, 37 to storage tank 38 and from there back to the scrubber 10.

Furthermore, at least part of the reaction solution can be supplied through line 26 to the regeneration tank 30. The tank 30 comprises an additional regeneration circle similar to FIG. 1 in which chlorine from a storage tank or bottles 40 is supplied via line 41 into the injector 43 which leads via line 35 and 36 back to the tank 30 which in turn is connected via line 31, pump 32 and line 33 with the injector 34. Via line 37 the resulting washing solution can be fed to storage tank 38 and from there back to the scrubbing tower 10.

Via line 27, additional calomel can be fed to the regeneration tank 30, in particular for forming the reaction solution during start-up.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMBERS

10 scrubber
10*a* packing
10*b* pump tank
10*c* mist eliminator
11-13 lines
14 pump
15-17 line
20, 20' settler
21-23 lines
24 separator
25-28 line
30 regeneration tank
31 line
32 pump
33 line
34 injector
35-37 lines
40 chlorine reservoir
41 line
50 injector
51-56 lines

The invention claimed is:

1. A process for removing mercury from a process gas, comprising:
    (i) reacting mercury vapour present in the process gas with mercuric chloride dissolved in a scrubbing solution so as to form a suspension containing mercurous chloride, and
    (ii) settling the mercurous chloride out of the suspension, wherein elemental chlorine is injected into the suspension before the settling step (ii) so as to form a reaction solution.

2. The process according to claim 1, further comprising supplying the settled mercurous chloride to a regeneration tank and supplying additional chlorine to the regeneration tank.

3. The process according to claim 1, wherein an amount of the chlorine injected into the suspension before the settling step (ii) is between 20 and 100 mol-% of an amount needed to regenerate the scrubbing solution for the reacting step (i).

4. The process according to claim 1, further comprising branching off a side stream of the suspension from the suspension prior to the suspension being provided to a settler for the settling step (ii) and injecting chlorine into the side stream.

5. The process according to claim 1, wherein at least part of the reaction solution is returned to the reacting step (i) before the settling step (ii).

6. The process according to claim 1, wherein the settling of the mercurous chloride takes place in a first stage and a second stage, zinc dust being mixed in the second stage.

7. The process according to claim 1, wherein an amount of the chlorine injected to the suspension before the settling or in the regeneration tank is controlled based on a chlorine content in the process gas after the reacting step (i).

8. The process according to claim 1, wherein the process gas comprises $SO_2$.

9. A plant for removing mercury from a process gas, comprising:
    a scrubber configured to react the mercury in the process gas with mercuric chloride in a scrubbing solution so as to form mercurous chloride in a suspension;
    at least one settler configured to settle the mercurous chloride out of the suspension; and
    an injection device disposed in a line between the scrubber and the at least one settler and configured to inject elemental chlorine into the suspension so as to form a reaction solution.

10. The plant according to claim 9, wherein the scrubber is a packed tower.

11. The plant according to claim 9, wherein the injection device is connected to a chlorine reservoir containing the elemental chlorine.

12. The plant according to claim 9, wherein the line extends from an outlet of the scrubber to an inlet of the at least one settler such that the reaction solution is configured to be formed in the line after the outlet of the scrubber and provided to the inlet of the at least one settler.

* * * * *